United States Patent [19]

Rosén et al.

[11] Patent Number: 4,798,169

[45] Date of Patent: Jan. 17, 1989

[54] PLANT FOR FISH FARMING IN THE OPEN SEA

[75] Inventors: Johnny Rosén, Höllviksnäs; Pär Wulff, Falsterbo, both of Sweden

[73] Assignee: Triflex Biomarin AB, Trelleborg, Sweden

[21] Appl. No.: 787,792

[22] PCT Filed: Jan. 28, 1985

[86] PCT No.: PCT/SE85/00033

§ 371 Date: Oct. 2, 1985

§ 102(e) Date: Oct. 2, 1985

[87] PCT Pub. No.: WO85/03411

PCT Pub. Date: Aug. 15, 1985

[30] Foreign Application Priority Data

Feb. 2, 1984 [SE] Sweden ............................ 8400533-9

[51] Int. Cl.⁴ ............................................. A01K 61/00
[52] U.S. Cl. ....................................................... 119/3
[58] Field of Search ................... 119/3, 5; 405/71, 72, 405/70, 218, 219, 220; 441/35, 43, 44, 45, 46, 54

[56] References Cited

U.S. PATENT DOCUMENTS

| | | | |
|---|---|---|---|
| 961,459 | 6/1910 | Ray | 441/45 |
| 3,579,680 | 5/1971 | McLean | 441/45 |
| 3,651,647 | 3/1972 | Flaviani . | |
| 3,691,974 | 9/1972 | Seiford, Sr. et al. | 405/219 |
| 3,818,708 | 6/1974 | Benson | 405/72 |
| 4,257,350 | 3/1981 | Streichenberger | 119/3 |
| 4,409,921 | 10/1983 | Carroll et al. | 441/35 |

FOREIGN PATENT DOCUMENTS 2091071 7/1982 United Kingdom ............. 119/3
2125261 3/1984 United Kingdom .

Primary Examiner—Robert P. Swiatek
Assistant Examiner—David L. Tarnoff
Attorney, Agent, or Firm—Merchant, Gould, Smith, Edell, Welter & Schmidt

[57] ABSTRACT

A plant for fish farming in the open sea, comprising a net-work container submerged into the water, and elongated hollow bodies (10) interconnected in pairs in parallel to each other one beside the other to form floating units, from which the container (33) is suspended. The ends of the hollow bodies are interconnected by universal joints to form a closed polygonal configuration around the net-work container.

9 Claims, 4 Drawing Sheets

PLANT FOR FISH FARMING IN THE OPEN SEA

The invention relates to a plant for fish farming in the open sea, comprising a net-work container submerged into the water, and elongated hollow bodies floating on the water, from which said container is suspended.

Prior art plants of this kind are of a construction which does not allow the plant to be used in water regions where large wave movements may be expected, because there is a risk that the plant will be broken down when such large wave movements are encountered.

The purpose of the invention is to provide a plant of the kind referred to above which is suitable for water regions wherein large wave movements may be expected so that the fish farming can be carried on in such regions of the ocean far from land where the water is of a higher quality and where the influence from the environment is less concentrated.

In order to achieve this object the plant of the invention has obtained the characteristics appearing from claim 1.

Figure 1:
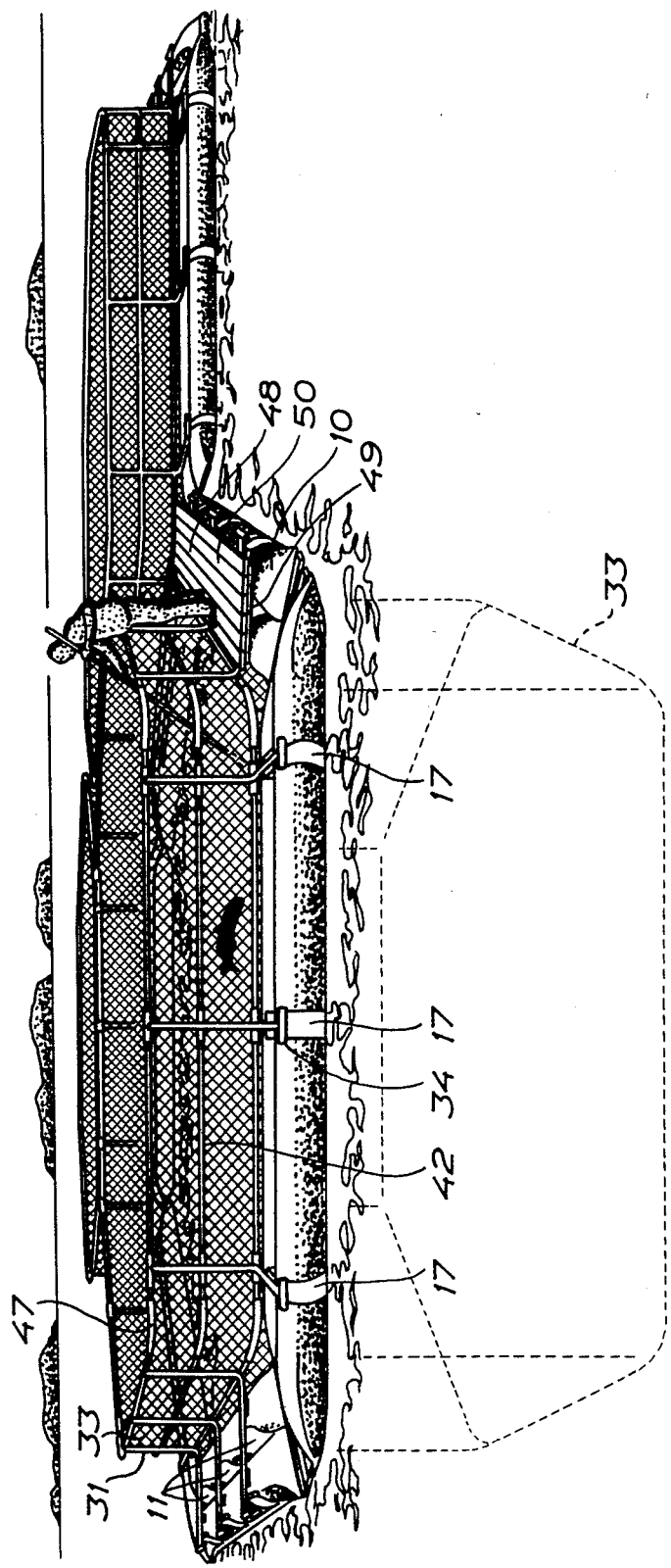
Figure 2:
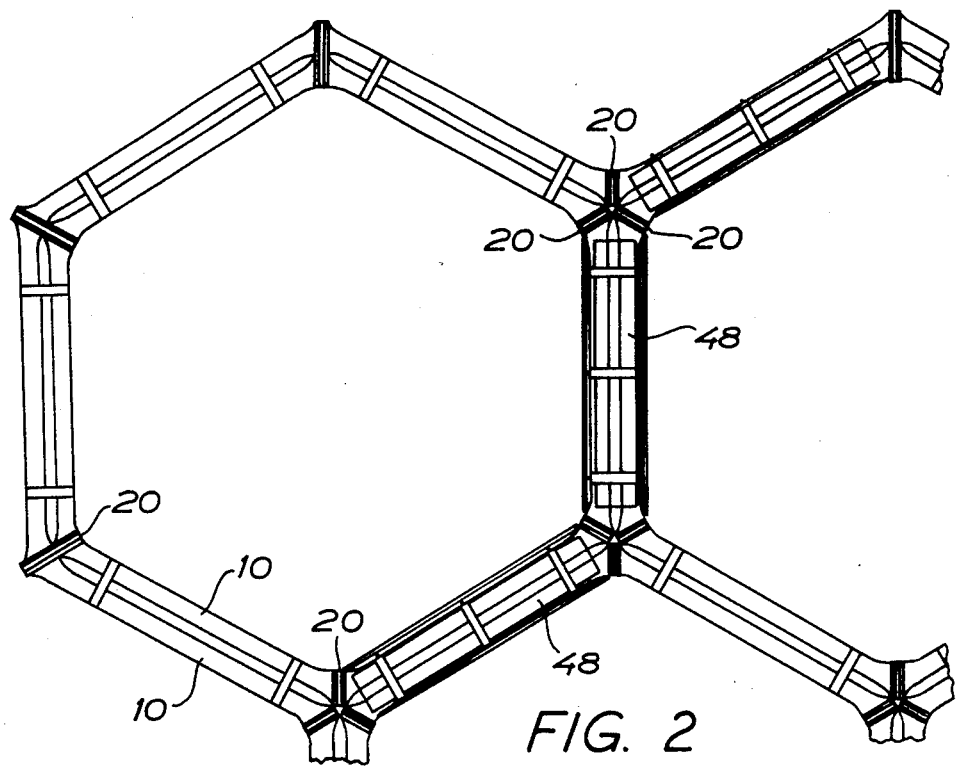
Figure 4:
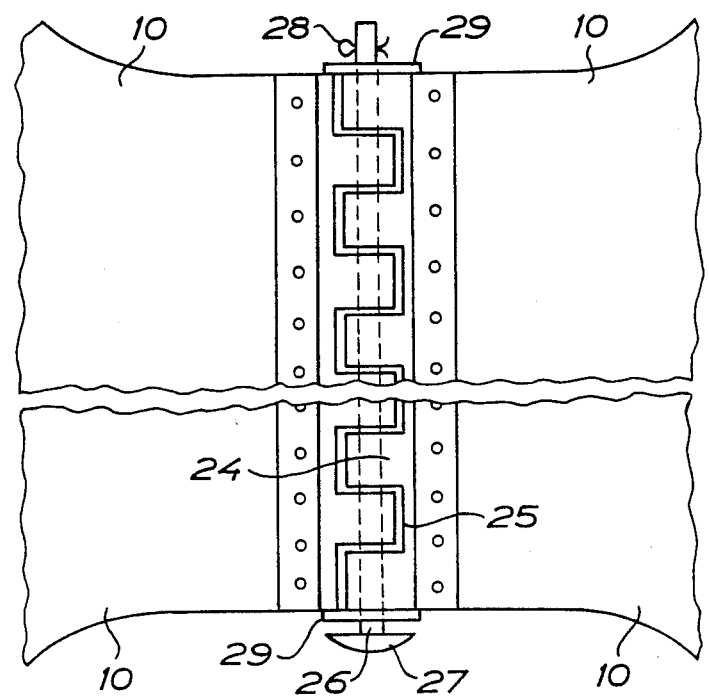
Figure 3:
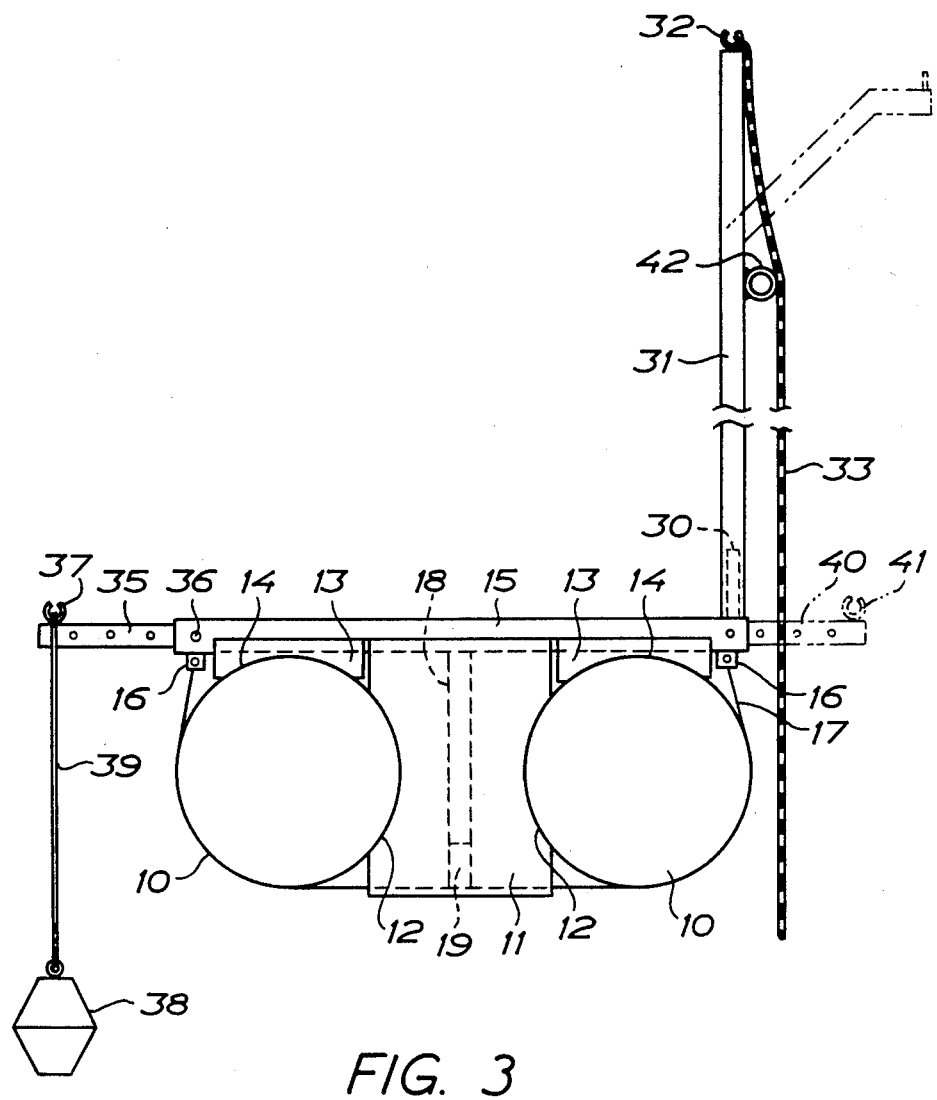
Figure 5:
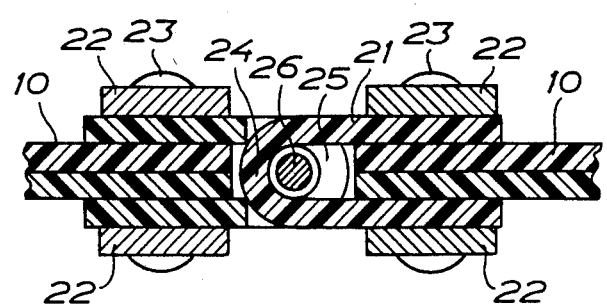
Figure 6:
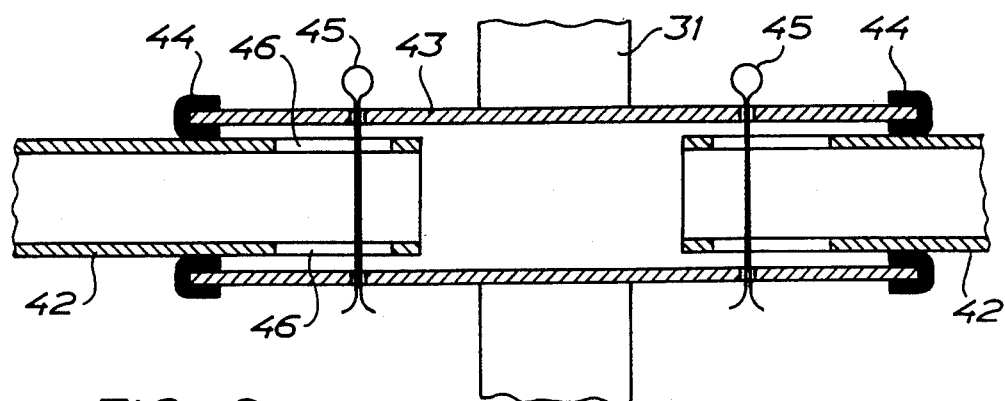
Figure 7:
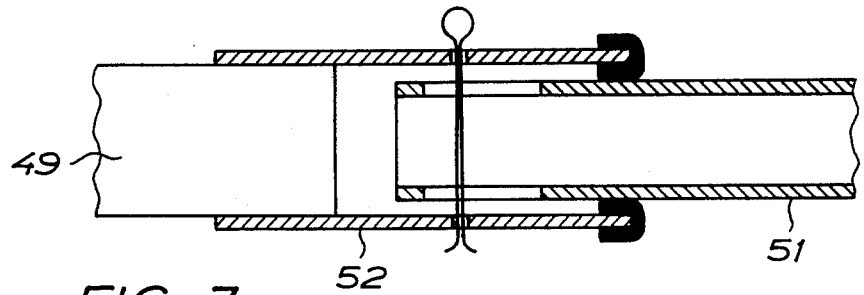
Figure 8:
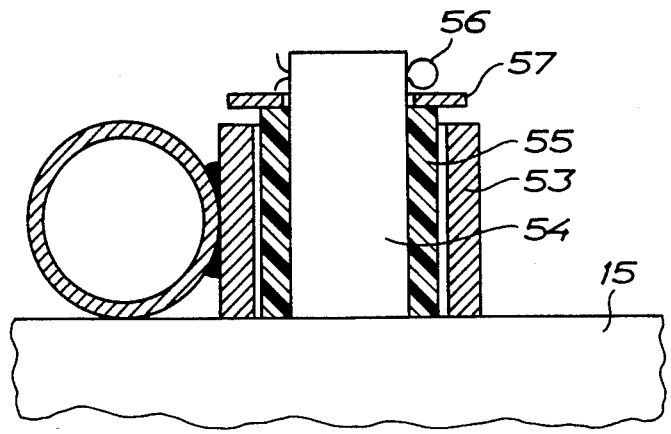

In order to explain the invention in more detail reference is made to the accompanying drawings in which FIG. 1 is a perspective view of a fish farming plant of the invention in a preferred embodiment thereof, FIG. 2 is a fragmentary plan view of the plant in FIG. 1, FIG. 3 is an enlarged cross-sectional view of two hollow bodies connected together to form a floating unit, FIG. 4 is a plan view of the connection between two floating units, FIG. 5 is a cross-sectional view of the connection shown in FIG. 4, FIG. 6 is an axial sectional view of a joint provided in a protective railing, FIG. 7 is an axial sectional view of a joint for interconnecting platforms supported by the hollow bodies, and FIG. 8 is an axial sectional view of a connection between a platform and a hollow body.

With reference to FIGS. 1 and 2 the plant for fish farming in the open sea shown therein comprises a number of elongated closed hollow bodies 10 of rubber or plastic material, which can be substantially shape permanent but also can comprise inflatable hollow bodies which may be filled with balls or similar bodies of a light plastic material so as to be kept floating even if the body should be punctured. In the preferred embodiment, the hollow bodies are made of lengths of cylindrical rubber tubing, which are closed at the ends by the tubing being flattened and the flat portions thereof being interconnected by gluing or vulcanization.

The bodies 10 are interconnected in pairs with the bodies of each pair extending in parallel, spaced one beside the other to form floating units. The connection between the bodies of each unit is shown in more detail in FIG. 3 to which reference now is made.

Between the two bodies 10 of each unit there is provided a spacer 11 forming two opposite circular recesses 12 each receiving one of the hollow bodies 10. On top of each tubular body there is provided a spacer 13 also formed with a circular recess 14 to receive the associated body therein, and a tube 15 having square cross-sectional form is located on top of the three spacers 11 and 13. The spacers form aligned grooves to receive the tube 15 therein, and the tube projects at each end from the spacers 13. In a lug 16 connected to the tube 15 at each projecting end portion thereof a strap 17 is connected at the end thereof and extends around the two hollow bodies 10 of the unit. The strap preferably is received in a groove formed by the lower surface of the spacer 11. The strap 17 can be tightened by fitting the strap around the hollow bodies stretched around said bodies and then pressurizing the interior of the hollow bodies so as to engage the wall thereof against the strap and thus tightening the strap around the bodies. A tube 18 is connected to the tube 15 perpendicularly to the lower side thereof and is received in a bore 19 in the spacer 11 to center the tube 15 in the floating unit.

The floating units formed by the interconnected hollow bodies 10 are each interconnected at the ends thereof by universal joints 20 to form a closed configuration, viz. in the embodiment described a hexagonal configuration as is best shown in FIG. 2. The connection between adjacent ends of the hollow bodies is disclosed in more detail in FIGS. 4 and 5 to which reference is made. On the flattened and closed end of each hollow body there is mounted a flat rubber element 21 which is engaged with the upper and lower sides of the flattened portion and projects from said portion to form a bow. A metal rail 22 is located on the upper and lower sides of the element 21, and a bolt or rivet connection 23 passing through the rails 22, the element 21 and the flattened portion of the hollow body connects the element 21 to said body. The bow of each element 21 forms projecting portions 24 and recesses 25 alternating with each other as shown in FIG. 4, and the projecting portions of one element 21 are received by the recesses of an adjacent element 21 as is also shown in FIG. 4. A bar 26 having a head 27 at one end is passed through the bows formed by the elements 21 and is locked with a split pin 28 at the other end, washers 29 being located on the bar 26 between the head 27 and the elements 21 and between the split pin 28 and the elements 21.

Thus, it will be seen that the ends of two adjacent ends of the hollow bodies, connected together, are pivoted about the bar 26. However, since the elements 21 are made of rubber, the two hollow bodies are allowed to move universally in relation to each other over a limited angle also about an axis which is perpendicular to the axis of the bar 26.

An advantage provided by the joint shown in FIGS. 4 and 5 is that the ends of the bodies can be prefabricated in a factory and the only thing that has to be done when the plant is built on the sea, is to interconnect the prefabricated end portions by means of the bar 26.

As will be seen in FIG. 2, the hollow bodies should be individually connected by means of three joints where three units are to be interconnected while one joint preferably is provided where only two floating units are to be interconnected.

On top of the end portion of each tube 15, projecting towards the space surrounded by the floating units forming an hexagonal configuration, there is provided an upwardly projecting pin 30 on which a tubular upright 31 is mounted. At the upper end of each upright 31 there is provided a hook 32, pin or similar element for suspending a net-work container 33 therefrom. As indicated in FIG. 3 by dot-and-dash lines the upper portion of the upright 31 in a modified embodiment can be angled towards the space surrounded by the floating units. The net-work container extends into the water to a suitable depth and forms bottom and sides so as to define an enclosure for farmed fish swimming in the sea and thus confined to the space defined by the container. The net-work container should be made of a material which can stand attacks from the water and preferably should be impregnated or treated in another way so as to be rot-proof and algae-repellent.

In order to counterbalance the weight of the network container a counterweight 34 can be provided at the end of the tube 15 opposite to the upright 31 as shown in FIG. 1 or, as shown in FIG. 3, a tube or bar 35 can be telescoped in the tube 15 so as to project therefrom over a desired length. Means 36 such as a bolt or pin is provided to lock the tube or bar 35 in the adjusted position. On the tube or bar 35 there is provided a hook element 37 from which a counterweight 38 is suspended by a rope 39. It is also possible to suspend by means of the rope 39 a skirt of plastic or rubber which hangs down into the water to a desired depth and forms a protecting barrier around the net-work container. Weights can be provided at the lower edge of the skirt. As will be understood, the tube or bar 35 should be adjusted to such position that the floating unit is counterbalanced to a position in which the tube 15 is substantially horizontal.

In a modified embodiment, a tube or bar 40 is provided also at the other end of the tube 15, provided with a hook element 41 for suspending the net-work container therefrom as an alternative to the arrangement described in which said container is suspended from the upright 31.

Along the floating bodies there is provided a protective railing on the inner or outer side of the uprights 31. This railing comprises one or more tubes 42 extending between adjacent uprights 31, and these tubes are mounted to the uprights in the manner disclosed in FIG. 6. A socket 43 is fixedly connected to the upright 31 and extends transversely of the upright. At each end of the socket 43, a rubber sleeve 44 is mounted which receives the end of the tube 42 extending into the socket 43. A split pin 45 is passed through the socket 43 and axial slots 46 formed by the tube 42, to limit axial movement of the tube 42 in relation to the socket 43. The sleeve 44 permits the tube 42 to be angled in relation to the socket 43 over a limited angle, and thus the tube can move universally in relation to the socket 43 so as to avoid breakage when the hollow bodies are distorted at rough sea.

When three uprights are provided on each floating unit as shown in FIG. 1, the connection disclosed in FIG. 6 need be provided at the middle upright only. The tube 42 then can pass through a socket 43 with sleeves 44 on the end uprights such that the end portion of said tube projects therefrom. The projecting end portions of adjacent tubes 42 are interconnected by flexible tubes 47 of rubber or plastic material which allow relative movement between adjacent floating units. These tubes can be replaced by chains or similar elements.

One floating unit or the other can be provided with a platform 48 as shown in FIG. 1. This platform preferably comprises a tubular frame 49 which is supported on top of the tubes 15 and are provided with battens 50. Adjacent ends of the platforms can be interconnected as shown in FIG. 7 by means of a connecting tube 51 which is inserted into a socket 52, fixedly connected to the frame 49, in a similar manner to that shown in FIG. 6. The frame 49 is connected to the tube 15 as shown in FIG. 8. A socket 53 is fixedly connected to the frame and is passed onto a cylindrical stud 54 connected to the tube 15 projecting upwards therefrom. A bushing 55 of rubber material is located between the socket 53 and the stud 54 so as to form a flexible connection between the frame 49 and the tube 15. The socket 53 is maintained on the stud 54 by means of a split pin 56 passing transversely through the stud, and a washer 57.

We claim:

1. Plant for fish farming in the open sea, comprising a container of netting to be submerged into the water, a plurality of elongated tubular float bodies to be horizontally disposed on the sea surface, said bodies being closed at their ends, said ends having flattened end portions, means interconnecting the float bodies in pairs to form floating units, the float bodies of each pair extending in parallel one beside the other, the flattened end portions thereof extending substantially horizontally, and means interconnecting adjacent ends of the float bodies at said flattened end portions thereof for pivotal relative movement of the interconnecting float bodies about a substantially horizontal transverse axis, said connecting means being flexible to allow limited relative movement of the float bodies about the longitudinal axis thereof, said float bodies forming a closed configuration around the container of netting suspended therefrom.

2. Plant as claimed in claim 1 wherein said interconnecting means comprise interlocking loops of a resilient material and a shaft element (26) extending through said loops.

3. Plant as claimed in claim 2 wherein said elongated tubular float bodies are provided with uprights (31) and that the container of netting is suspended from the uprights.

4. Plant as claimed in claim 3 wherein the uprights (31) form part of a railing (31, 42) extending along the float bodies (10) around the container of netting (33).

5. Plant as claimed in claim 2 wherein a platform (48) is supported on top of at least one pair of float bodies.

6. Plant as claimed in claim 2 wherein the floating units formed by the float bodies (10) are counterbalanced by means of counterweights (34; 38).

7. Plant as claimed in claim 6 wherein the float bodies (10) of each floating unit are clamped against a spacer (11) located between the bodies, by means of a strap (17) surrounding the bodies (10).

8. Plant as claimed in claim 7, wherein the strap (17) is connected to a rigid element (15) overlying the hollow bodies (10).

9. A plant according to claim 2 wherein said interlocking loops form flexible hinge elements.

* * * * *